(12) United States Patent
Tu et al.

(10) Patent No.: US 12,018,793 B2
(45) Date of Patent: Jun. 25, 2024

(54) SET OF ELECTRONIC DEVICE, STAND THEREOF AND PIVOTING MECHANISM THEREOF

(71) Applicant: Wistron Corporation, New Taipei (TW)

(72) Inventors: Chin-Hsiung Tu, New Taipei (TW); Ting-Yao Cheng, New Taipei (TW); Chen-Pu Yang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 413 days.

(21) Appl. No.: 17/560,323

(22) Filed: Dec. 23, 2021

(65) Prior Publication Data

US 2023/0089441 A1 Mar. 23, 2023

(30) Foreign Application Priority Data

Sep. 22, 2021 (TW) ................................ 110135210

(51) Int. Cl.
*F16M 11/12* (2006.01)
*B60R 11/02* (2006.01)
(Continued)

(52) U.S. Cl.
CPC ............. *F16M 11/12* (2013.01); *B60R 11/02* (2013.01); *H04M 1/04* (2013.01);
(Continued)

(58) Field of Classification Search
CPC . F16M 11/12; B06R 11/02; B06R 2011/0017; H04M 1/04
See application file for complete search history.

(56) References Cited

U.S. PATENT DOCUMENTS 8,649,166 B2 * 2/2014 Wu ........................ G06F 1/1626
361/679.55
8,864,628 B2 * 10/2014 Boyette .............. A63B 71/0619
482/901

(Continued)

FOREIGN PATENT DOCUMENTS

JP    H11-303850 A    11/1999
JP    2020-43527 A    3/2020

OTHER PUBLICATIONS

Examination report dated Feb. 14, 2023, listed in correspondent Japan patent application No. 2021-198305.

*Primary Examiner* — Hai V Nguyen
(74) *Attorney, Agent, or Firm* — McClure, Qualey & Rodack, LLP

(57) ABSTRACT

A stand having a pivoting mechanism is included in a set of electronic device. The pivoting mechanism includes a first pivoting element, a second pivoting element pivotally connected to the first pivoting element, a multi-positioning assembly connected to the first and the second pivoting element, and a restoring element having two ends that are respectively contacting the first and the second pivoting element. When the second pivoting element is, respectively, at a first and a second position, a first and a second angle are formed between the first and the second pivoting element. The first angle is less than the second angle. The multi-positioning assembly temporarily positions the first pivoting element with the second pivoting element. When the second pivoting element is, respectively, at the first and the second position, the restoring element has a first and a second deformation. The first deformation is less than the second deformation.

20 Claims, 14 Drawing Sheets

(51) Int. Cl.
*H04M 1/04* (2006.01)
*B60R 11/00* (2006.01)

(52) U.S. Cl.
CPC ............... *B60R 2011/0017* (2013.01); *B60R 2011/0059* (2013.01); *B60R 2011/0087* (2013.01); *F16M 2200/041* (2013.01); *F16M 2200/06* (2013.01)

(56) References Cited

U.S. PATENT DOCUMENTS

| | | | | |
|---|---|---|---|---|
| 8,899,534 | B2* | 12/2014 | Chi | F16M 13/022 248/124.2 |
| 9,377,156 | B2* | 6/2016 | Wong | F16M 11/2092 |
| 9,527,456 | B2* | 12/2016 | Ackeret | B60R 11/0241 |
| 9,795,055 | B1* | 10/2017 | Campbell | G06F 1/20 |
| 9,907,373 | B2* | 3/2018 | Han | A45C 9/00 |
| 10,007,110 | B2* | 6/2018 | Amaru | G06F 3/03547 |
| 10,155,483 | B2* | 12/2018 | Catlin | B60R 11/0241 |
| 10,173,607 | B1* | 1/2019 | Omelchenko | B60H 3/0028 |
| 10,266,125 | B2* | 4/2019 | Wang | B60R 1/00 |
| 10,272,847 | B1* | 4/2019 | Fan | B60R 11/0241 |
| 10,557,590 | B1* | 2/2020 | Brassard | B62J 11/00 |
| 10,988,197 | B1* | 4/2021 | Hamilton | F16B 2/10 |
| 11,186,337 | B1* | 11/2021 | Hamilton | F16B 2/22 |
| 11,528,987 | B1* | 12/2022 | Girault | G06F 1/1628 |
| 11,856,121 | B2* | 12/2023 | Douglas | F16M 13/04 |
| 11,910,916 | B1* | 2/2024 | Cohn | F16M 13/022 |
| 2003/0162510 | A1* | 8/2003 | Kim | A45F 5/02 455/575.1 |
| 2005/0257352 | A1* | 11/2005 | Carnevali | B60R 11/0241 24/523 |
| 2007/0022582 | A1* | 2/2007 | Carnevali | F16M 11/14 24/523 |
| 2007/0022583 | A1* | 2/2007 | Carnevali | B60R 11/0252 24/523 |
| 2009/0008518 | A1* | 1/2009 | Shen | F16M 11/2021 248/122.1 |
| 2011/0057083 | A1* | 3/2011 | Carnevali | G06F 1/163 248/274.1 |
| 2011/0192857 | A1* | 8/2011 | Rothbaum | F16M 11/041 248/220.21 |
| 2011/0220697 | A1* | 9/2011 | Luk | B60R 11/0258 224/567 |
| 2011/0248060 | A1* | 10/2011 | Luk | B60R 11/02 224/567 |
| 2012/0080465 | A1* | 4/2012 | Son | B62J 50/225 224/276 |
| 2012/0176741 | A1* | 7/2012 | Wu | G06F 1/1686 361/679.28 |
| 2012/0223196 | A1* | 9/2012 | Musselman | B60R 11/02 248/220.21 |
| 2014/0118899 | A1* | 5/2014 | Chi | F16M 13/022 403/53 |
| 2014/0138418 | A1* | 5/2014 | Dunn | B60R 11/02 224/483 |
| 2014/0274565 | A1* | 9/2014 | Boyette | A63B 22/0694 482/6 |
| 2014/0353453 | A1* | 12/2014 | Quijano | F16M 11/18 248/419 |
| 2015/0054760 | A1* | 2/2015 | Amaru | G02B 27/01 345/173 |
| 2015/0055278 | A1* | 2/2015 | Baschnagel | H05K 5/0204 361/679.01 |
| 2015/0329062 | A1* | 11/2015 | Ackeret | B60R 11/02 248/220.22 |
| 2015/0366336 | A1* | 12/2015 | Wong | F16M 11/38 248/371 |
| 2016/0048176 | A1* | 2/2016 | Saito | G06F 1/1681 16/302 |
| 2016/0192750 | A1* | 7/2016 | Han | A45C 9/00 190/11 |
| 2017/0100974 | A1* | 4/2017 | Smith | A01B 59/068 |
| 2017/0246992 | A1* | 8/2017 | Giesmann | E06C 5/24 |
| 2018/0043840 | A1* | 2/2018 | Minn | B60R 11/0241 |
| 2018/0111690 | A1* | 4/2018 | Zheng | B60N 3/004 |
| 2018/0118131 | A1* | 5/2018 | Lowell | B60R 11/0241 |
| 2018/0149302 | A1* | 5/2018 | Papapanos | F16M 13/022 |
| 2018/0264312 | A1* | 9/2018 | Pompile | A63B 21/4049 |
| 2018/0334106 | A1* | 11/2018 | Beauregard | B60R 11/0235 |
| 2018/0372266 | A1* | 12/2018 | Yen | F16M 11/2021 |
| 2019/0322223 | A1* | 10/2019 | Hancock | F16B 2/08 |
| 2020/0215882 | A1* | 7/2020 | Paul | B60R 16/02 |
| 2020/0229894 | A1* | 7/2020 | Chang | A61B 90/37 |
| 2020/0254940 | A1* | 8/2020 | Dang | F16B 2/22 |
| 2021/0001780 | A1* | 1/2021 | Hancock | B60R 11/00 |
| 2021/0016721 | A1* | 1/2021 | Shin | B60R 11/0241 |
| 2021/0129768 | A1* | 5/2021 | Leimer | B60R 11/0241 |
| 2021/0178862 | A1* | 6/2021 | Alves | B60R 11/02 |
| 2021/0215327 | A1* | 7/2021 | Grandadam | F16M 11/10 |
| 2021/0348629 | A1* | 11/2021 | Fan | F16M 11/2064 |
| 2021/0385316 | A1* | 12/2021 | Douglas | F16M 13/04 |
| 2022/0024387 | A1* | 1/2022 | Vite Cadena | B60R 7/04 |
| 2022/0046123 | A1* | 2/2022 | Zhang | H04B 1/3877 |
| 2023/0026523 | A1* | 1/2023 | Dessapt | B60R 11/0235 |
| 2024/0043082 | A1* | 2/2024 | Dolotallas | B62J 1/08 |

* cited by examiner

US 12,018,793 B2

SET OF ELECTRONIC DEVICE, STAND THEREOF AND PIVOTING MECHANISM THEREOF

CROSS-REFERENCE TO RELATED APPLICATION

This non-provisional application claims priority under 35 U.S.C. § 119(a) to Patent Application No. 110135210 filed in Taiwan, R.O.C. on Sep. 22, 2021, the entire contents of which are hereby incorporated by reference.

BACKGROUND

Technical Field

The present disclosure relates to a set of electronic device, a stand thereof and a pivoting mechanism thereof, and specifically, to a portable electronic element fixed to a specific position of a set of electronic device through a pivoting mechanism and a stand.

Related Art

A collapsible device usually has a pivoting mechanism to realize the function of bending or folding. However, in addition to basic functions such as bending and folding, the pivoting mechanism available on the market seems to be unable to provide additional advanced functions.

A stand used in a rear seat entertainment system of a car includes a hinge which can be used as the pivoting mechanism to have the function of bending or folding. By the way of the stand, passengers can comfortably enjoy the entertainment system in the rear seat of the car by simply adjusting the bending or folding angle of the stand.

SUMMARY

The above-mentioned stand is to fix the distance between an electronic device and the rear seat. The passengers in the rear seat are likely to be hurt by hitting on the stand when the running car is suddenly stopped due to accident or emergency brake.

In view of this, one of the objectives of the present disclosure is to develop a pivoting mechanism that can overcome the above problems has become one of the problems to be solved.

In addition, one of the objectives of the present disclosure is to develop a stand and/or a set of electronic device that can overcome the above problems has also become one of the problems to be solved.

According to some embodiments, a pivoting mechanism comprises a first pivoting element, a second pivoting element, a multi-positioning assembly, and a restoring element. The second pivoting element is pivotally connected to the first pivoting element, and the second pivoting element has a first position and a second position. Between the first pivoting element and the second pivoting element has a first angle when the second pivoting element is at the first position. Between the first pivoting element and the second pivoting element has a second angle when the second pivoting element is at the second position. The first angle is less than the second angle. The multi-positioning assembly is connected to the first pivoting element and the second pivoting element. The multi-positioning assembly provides with a plurality of positioning locations to temporarily position the first pivoting element with the second pivoting element. The restoring element has two ends, and the two ends respectively contact the first pivoting element and the second pivoting element. The restoring element has a first deformation when the second pivoting element is at the first position. The restoring element has a second deformation when the second pivoting element is at the second position. The first deformation is less than the second deformation.

Further, according to some embodiments, a stand comprises a stand fixing element, a pivoting mechanism, and a device fixing element. The pivoting mechanism comprises a first pivoting element, a second pivoting element, a multi-positioning assembly, and a restoring element. The first pivoting element is connected to the stand fixing element. The second pivoting element is pivotally connected to the first pivoting element, and the second pivoting element has a first position and a second position. A distance between the stand fixing element and the second pivoting element at the second position is greater than a distance between the stand fixing element and the second pivoting element at the first position. The multi-positioning assembly is connected to the first pivoting element and the second pivoting element, and the multi-positioning assembly provides with a plurality of positioning locations to temporarily position the first pivoting element with the second pivoting element. The restoring element has two ends, and the two ends respectively contact the first pivoting element and the second pivoting element. The restoring element has a first deformation when the second pivoting element is at the first position. The restoring element has a second deformation when the second pivoting element is at the second position. The first deformation is less than the second deformation. The device fixing element is connected to the second pivoting element.

According to some embodiments, the stand further comprises a first hinge. The first hinge comprises a first rod element and a second rod element. The first rod element is pivotally connected to the second rod element. The first rod element is connected to the second pivoting element, and the second rod element is connected to the device fixing element.

Further, according to some embodiments, a set of electronic device comprises a stand fixing element, a pivoting mechanism, a device fixing element, and a portable electronic element. The pivoting mechanism comprises a first pivoting element, a second pivoting element, a multi-positioning assembly, and a restoring element. The first pivoting element is connected to the stand fixing element. The second pivoting element is pivotally connected to the first pivoting element, and the second pivoting element has a first position and a second position. A distance between the stand fixing element and the second pivoting element at the second position is greater than a distance between the stand fixing element and the second pivoting element at the first position. The multi-positioning assembly is connected to the first pivoting element and the second pivoting element. The multi-positioning assembly provides with a plurality of positioning locations to temporarily position the first pivoting element with the second pivoting element. The restoring element has two ends, and the two ends respectively contact the first pivoting element and the second pivoting element. The restoring element has a first deformation when the second pivoting element is at the first position. The restoring element has a second deformation when the second pivoting element is at the second position. The first deformation is less than the second deformation. The device fixing element is connected to the second pivoting element. The device fixing element holds the portable electronic element. The portable electronic element is a mobile (such as a smart phone, a tablet computer, etc.) or an element having a display panel.

According to some embodiments, the multi-positioning assembly comprises a first positioning element and a second positioning element. The first positioning element is connected to the first pivoting element, and the first positioning element comprises a first matching element. The second positioning element is connected to the second pivoting element, and the second positioning element comprises a second matching element. The first matching element is matched to the second matching element at the positioning locations to temporarily position the first pivoting element with the second pivoting element.

According to some embodiments, the first positioning element has a first surface, and the second positioning element has a second surface. The first matching element comprises an elastic component on the first surface facing the second positioning element, and the elastic component normally protrudes from the first surface. The second matching element comprises a plurality of recess parts on the second surface facing the first positioning element. The first pivoting element and the second pivoting element are selectively on the first position or the second position, and the elastic component is positioned at one of the recess parts to temporarily position the first pivoting element with the second pivoting element.

According to some embodiments, the elastic component comprises a spring and a bead. The spring is in the first surface. The bead is connected to the spring and the bead normally protrudes from the first surface. The bead is selectively positioned at one of the recess parts to temporarily position the first pivoting element with the second pivoting element.

According to some embodiments, each of some of the recess parts has a chamfer.

According to some embodiments, the chamfer at which the bead is positioned is a first chamfer when the second pivoting element is at the first position. The chamfer at which the bead is positioned is a second chamfer when the second pivoting element is at the second position, and a chamfer depth of the first chamfer is greater than a chamfer depth of the second chamfer.

According to some embodiments, the elastic component comprises a first fixing column and a reed. The first fixing column is in the first surface. The reed has an end, and the end corresponds to the first fixing column. The reed normally protrudes from the first surface. The reed is selectively positioned at one of the recess parts to temporarily position the first pivoting element with the second pivoting element.

According to some embodiments, the end of the reed has a ditch, and a dimension of the ditch is greater than a dimension of the first fixing column.

According to some embodiments, the elastic component comprises a second fixing column. The second fixing column is in the first surface. Another end of the reed corresponds to the second fixing column.

According to some embodiments, the end of the reed is fixed to the first fixing column, and the another end of the reed is fixed to the second fixing column.

According to some embodiments, the first matching element is a reed, and the second matching element is a sector gear. The sector gear has a plurality of mounting teeth. The reed is selectively positioned at one of the mounting teeth to temporarily position the first pivoting element with the second pivoting element.

According to some embodiments, the sector gear has a limiting tooth, and the limiting tooth is disposed to the mounting teeth. The limiting tooth is on a side of the sector gear. The side is relatively near to the second position. A height of the limiting tooth is higher than heights of the mounting teeth.

In summary, the embodiments of the present disclosure have at least one of the following effects:

(1) Through the combination of the restoring element and the multi-positioning assembly in the pivoting mechanism, the pivoting mechanism is in a temporary positioning state, and can thus generate a restoring action when the pivoting mechanism is subjected to a force exceeding a pivoting threshold value.

(2) Through at least one pivoting mechanism in a stand, the stand is in a temporary positioning state, and the stand can thus have a restoring action when the pivoting mechanism is subjected to a force exceeding a pivoting threshold value. Therefore, the stand can reduce (or even avoid) the possibility of injury to the user due to the inability of the pivoting mechanism to quickly generate the restoring action when encountered with an emergency situation.

(3) Through at least one pivoting mechanism in a stand and a portable electronic element in a set of electronic device, the set of electronic device is in a temporary positioning state, and the set of electronic device can thus have a restoring action when the pivoting mechanism is subjected to a force exceeding a pivoting threshold value. Therefore, the set of electronic device can reduce (or even avoid) the possibility of injury to the user due to the inability of the pivoting mechanism to quickly generate the restoring action when encountered with an emergency situation.

The detailed features and advantages of the present disclosure are described in detail in the following embodiments, and the content is sufficient to enable any person who is familiar with the relevant art to understand the technical contents of the present disclosure and implement them accordingly. Based on the disclosed contents of the specification, claim(s) and drawing(s), any person who is familiar with the relevant art can easily understand the purposes and advantages related to the embodiments of the present disclosure.

DETAILED DESCRIPTION

The following description is supplemented with the drawings to illustrate the embodiments of the present disclosure more clearly.

Figure 1A:
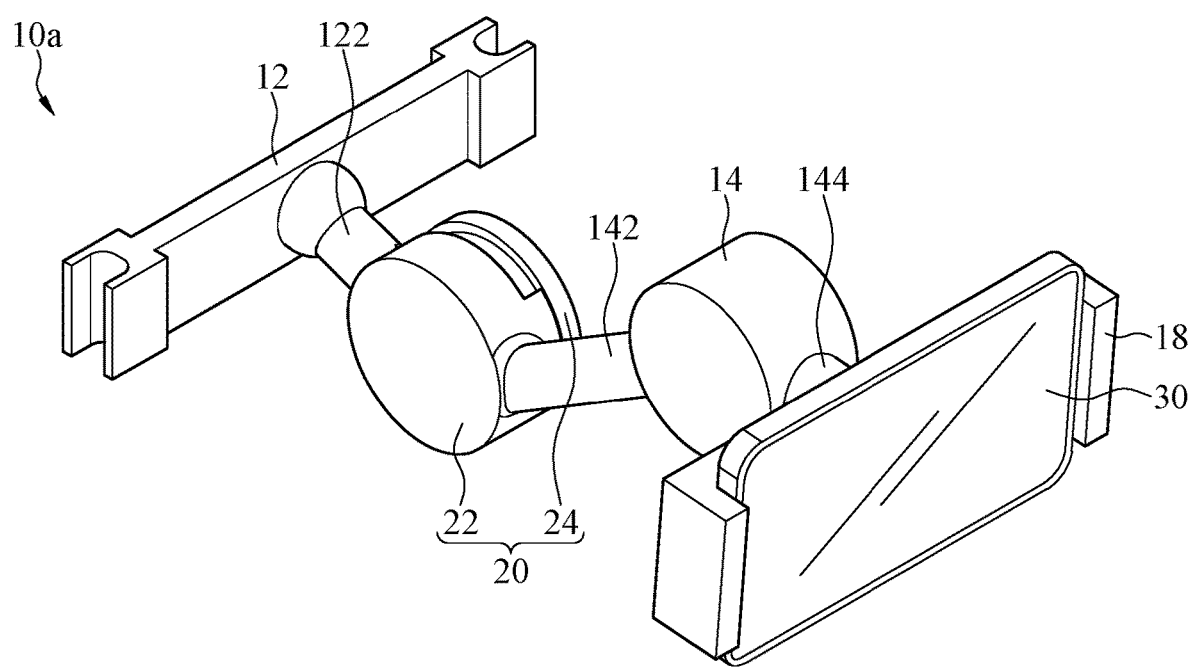
FIG. 1A illustrates a perspective view of a set of electronic device according to some embodiments.
Figure 1B:
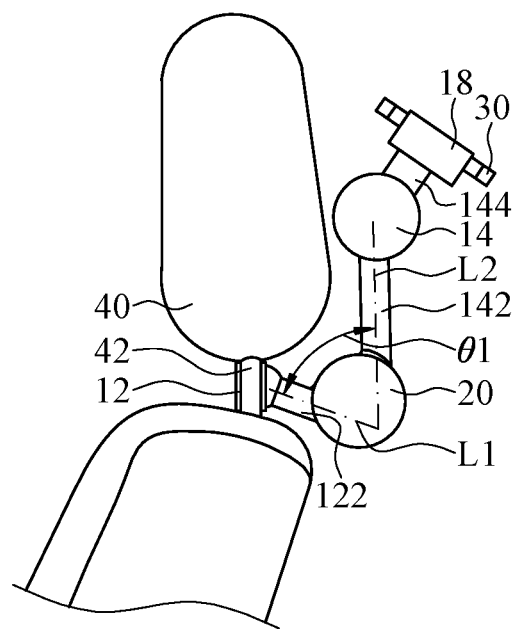
FIG. 1B illustrates a side view of a set of electronic device according to some embodiments.

Referring to FIG. 1A, FIG. 1A illustrates a perspective view of a set of electronic device according to some embodiments. The set of electronic device comprises a stand 10a and a portable electronic element 30. An end of the stand 10a is connected to the portable electronic element 30, and the other end of the stand 10a is connected to a fixed element. The portable electronic element 30 is a mobile device (such as a smart phone or a tablet computer), a display device (such as a display screen), or an LCD TV. The fixed element is not limited here, and may be, for example, a headrest connector 42 of a vehicle seat 40 as shown in FIG. 1B. The above connection method may be a physical connection method such as fixed or pivoting connection, which is not limited herein. Based on this, the set of electronic device will have different uses and functions due to the connection of different portable electronic elements 30 and fixed elements, such as being used in a rear seat entertainment system of a car. Alternatively, the set of electronic device can also be used for other purposes such as electronic device display, supporting stand, and/or assistance, which should be all covered by the scope of the embodiments of the present disclosure.

The stand 10a comprises a stand fixing element 12, a pivoting mechanism 20 and a device fixing element 18. An end of the pivoting mechanism 20 is connected to the stand fixing element 12, and the other end of the pivoting mechanism 20 is connected to the device fixing element 18. Through the pivoting mechanism 20, the stand fixing element 12 and the device fixing element 18 can be arranged near to or away from each other. In addition, the device fixing element 18 and the stand fixing element 12 can be connected to different devices and fixed elements respectively, and the stand 10a can thus have different purposes and functions. For example, when the device fixing element 18 of the stand 10a is connected to a pillow, the stand 10a is the pillow stand; when the device fixing element 18 is connected to a fan, the stand 10a is the fan stand; when the device fixing element 18 is connected to a sanitary paper box, the stand 10a is the sanitary paper box stand. In addition, the stand 10a can also be applied to fields such as robotic arms, automated production and/or inspection equipment.

According to some embodiments, the stand fixing element 12 is detachably fixed to the fixed element, and can be used repeatedly. In FIG. 1A, both the two ends of the stand fixing element 12 are provided with grooves to be detachably clamped to the fixed element (for example, a headrest connector 42 of a vehicle seat 40 in FIG. 1B). The device fixing element 18 can hold, fix or house a portable electronic element 30 (for example, a smart phone, a tablet computer, a display screen, etc.).

Figure 2A:
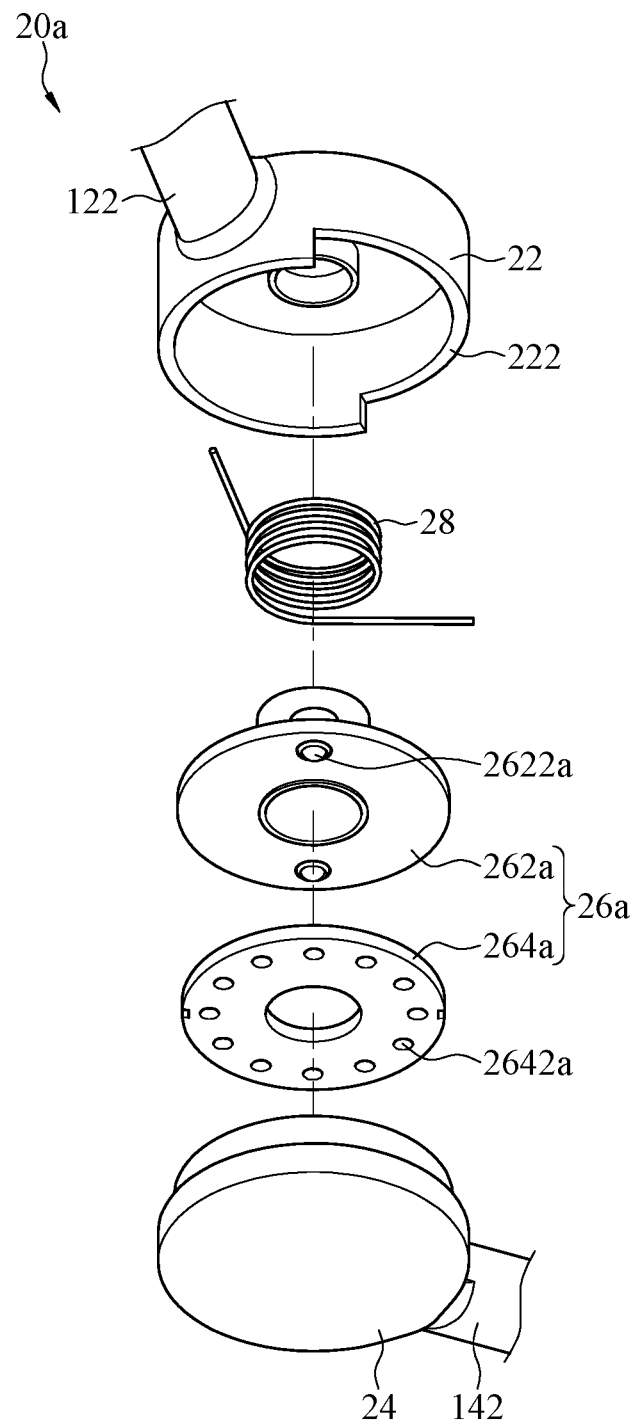
FIG. 2A illustrates a perspective explosion view of a pivoting mechanism according to some embodiments.

The pivoting mechanism 20 comprises a first pivoting element 22, a second pivoting element 24, a multi-positioning assembly 26a (shown in FIG. 2A), and a restoring element 28 (shown in FIG. 2A).

In FIG. 1A, the first pivoting element 22 is connected to the stand fixing element 12. The second pivoting element 24 is pivotally connected to the first pivoting element 22 to have a first position and a second position; that is, the first pivoting element 22 and the second pivoting element 24 can pivot relative to each other. When the second pivoting element 24 is at the first position, between the first pivoting element 22 and the second pivoting element 24 has a first angle. When the second pivoting element 24 is at the second position, between the first pivoting element 22 and the second pivoting element 24 has a second angle. The first angle is less than the second angle.

Figure 1C:
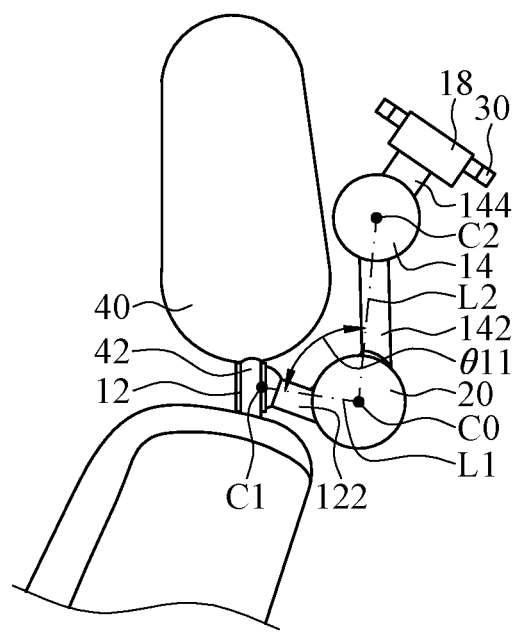
FIG. 1C illustrates a side view of a set of electronic device according to some embodiments.
Figure 1D:
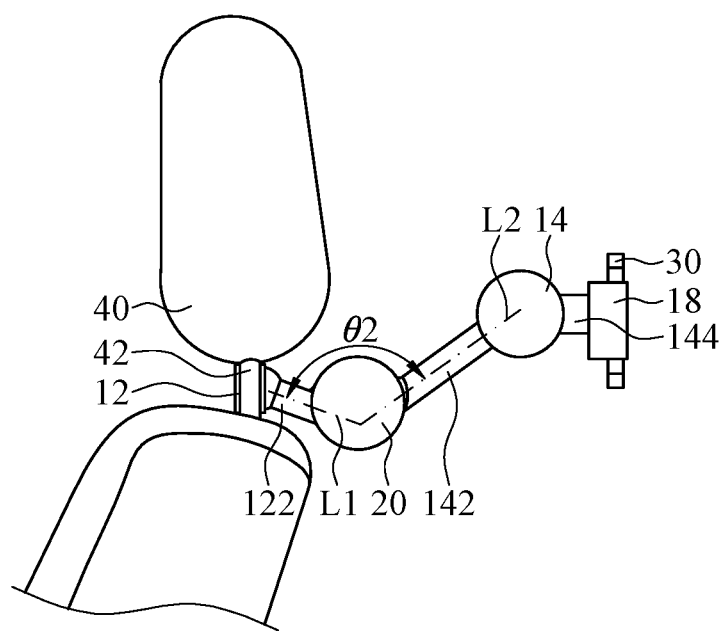
FIG. 1D illustrates a side view of a set of electronic device according to some embodiments.

Regarding the first angle and the second angle, the definitions are as follows. The pivoting mechanism 20 has two arms, and one of the arms is connected to the first pivoting element 22 and the other arm is connected to the second pivoting element 24. When the second pivoting element 24 is at the first position, between the arms has a first angle. When the second pivoting element 24 is at the second position, between the arms has a second angle. More specifically, referring to FIG. 1B and FIG. 1D, FIG. 1B and FIG. 1D respectively illustrate a side view of a set of electronic device according to some embodiments. In FIG. 1B, two arms of the pivoting mechanism 20 are respectively a stand connector 122 and a first rod element 142. The stand connector 122 is connected to the first pivoting element 22, and the first rod element 142 is connected to the second pivoting element 24. The stand connector 122 has a long axis L1, and the first rod element 142 has another long axis L2. When the second pivoting element 24 is at the first position, between the long axes L1, L2 has a first angle θ1 (shown in FIG. 1B). When the second pivoting element 24 is at the second position, between the long axes L1, L2 has a second angle θ2 (shown in FIG. 1D). As shown in FIG. 1B and FIG. 1D, the first angle θ1 is less than the second angle θ2.

Alternatively, when the pivoting mechanism 20 does not have arms, or the two arms are not rod-shaped or column-shaped, the first angle θ1 and the second angle θ2 can be defined by lines of connection connecting the pivoting mechanism 20 and centers (or centers of circles) of the stand fixing element 12, other pivoting mechanism, hinge or the device fixing element 18 that are connected with the pivoting mechanism 20. More specifically, referring to FIG. 1C, FIG. 1C illustrates a side view of a set of electronic device according to some embodiments. In FIG. 1C, the pivoting mechanism 20 is respectively connected to a stand connector 122 and a first hinge 14. The stand connector 12 is connected to the first pivoting element 22; and the first hinge 14 is connected to the second pivoting element 24. The pivoting mechanism 20 has a center of circle C0; the stand fixing element 12 has a center C1 (for example, geometric center or center of gravity); and the first hinge 14 has a center of circle C2. Between the line of connection L1 connecting the center of circle C0 and the center C1 and the line of connection L2 connecting the centers of circles C0 and C2 has an angle. At the first position in FIG. 1C, between the two lines of connection has a first angle θ11. The second position is defined correspondingly; and between the two lines of connection has also a second angle θ2 as the above mentioned, which is thus not be described in detail herein.

Referring to FIG. 1B and FIG. 1D at the same time, when the second pivoting element 24 is pivoting from a positioning location of FIG. 1B to a positioning location of FIG. 1D, the second pivoting element 24 will go through at least two positioning locations (pivoting from the first position to the second position). In other words, FIG. 1B and FIG. 1D illustrate the angle range between at least two positioning locations (the first position and the second position) of the pivoting mechanism 20.

Figure 1E:
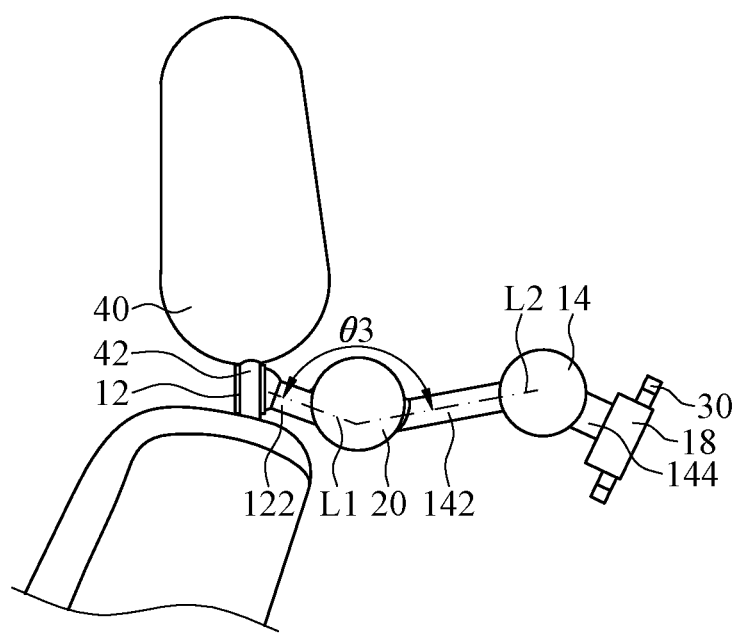
FIG. 1E illustrates a side view of a set of electronic device according to some embodiments.

Alternatively, the pivoting mechanism 20 has three or more positioning locations. Further referring to FIG. 1E, FIG. 1E illustrates a side view of a set of electronic device according to some embodiments. In FIG. 1E, between the long axes L1, L2 has a second angle θ3, and the second angle θ3 (shown in FIG. 1E) is greater than the second angle θ2 (shown in FIG. 1D). Referring to FIG. 1B, FIG. 1D, and FIG. 1E at the same time, when the second pivoting element 24 is pivoting from the positioning location of FIG. 1B through the positioning location of FIG. 1D to the positioning location of FIG. 1E, the second pivoting element 24 will go through at least three positioning locations (pivoting from the first position through the second position with a greater angle, and finally to the second position with a much greater angle). In other words, FIG. 1B, FIG. 1D, and FIG. 1E illustrate the angle range between at least three positioning locations (the first position and the two second positions) of the pivoting mechanism 20. Therefore, the second pivoting element 24 can relatively pivot to the first pivoting element 22 between these specific positions, thereby achieving the function of multi-stage pivoting.

In addition, the first position and the second position of the second pivoting element 24 are in a relative position relationship, rather than in an absolute position relationship. In other words, the relative first position and second position can be relatively determined according to the degrees of the above angles. More specifically, referring to FIG. 1D and FIG. 1E, the second angle θ2 in FIG. 1D is less than the second angle θ3 in FIG. 1E. Therefore, the second pivoting element 24 of FIG. 1D is positioned at the first position relative to the second pivoting element 24 of FIG. 1E, and the second pivoting element 24 of FIG. 1E is relatively positioned at the second position. In other words, FIG. 1D and FIG. 1E illustrate the angle range between at least two positioning locations (the first position and the second position) of the pivoting mechanism 20. Therefore, the second pivoting element 24 can relatively pivot to the first pivoting element 22 between these specific positions, thereby achieving the function of being able to adjust between a variety of different multi-stage pivoting clamping positions.

Referring to FIG. 2A, FIG. 2A illustrates a perspective explosion view of a pivoting mechanism 20a according to some embodiments. The restoring element 28 is a torsion spring or other elastic element with a restoring force. Two ends of the restoring element 28 contact the first pivoting element 22 and the second pivoting element 24, respectively. When the second pivoting element 24 is at a first position, the restoring element 28 has a first deformation. When the second pivoting element 24 is at a second position, the restoring element 28 has a second deformation. The first deformation is less than the second deformation. Therefore, the restoring element 28 can generate a restoring force for restoring from a greater deformation (that is, the second deformation) to a less deformation (that is, the first deformation). In other words, when the restoring element 28 is freely released, the restoring element 28 will generate a restoring force for restoring from the second position to the first position, so that the second pivoting element 24 will pivot from the second position to the first position.

In addition, in order to make the restoring element 28 contact the second pivoting element 24 and be able to pivot successfully between the first position and the second position, the first pivoting element 22 and the second pivoting element 24 can make some appropriate adjustments in the structure. In some embodiments, the first pivoting element 22 and the second pivoting element 24 each has an arm extending to the outside of the pivoting mechanism 10a, and the restoring element 28 contacts the arms of the first pivoting element 22 and the second pivoting element 24 respectively. Therefore, when the second pivoting element 24 pivots between the first position and the second position, the arms of the restoring elements 28 will interfere the pivoting or restoring action. Based on this, in order to prevent the pivoting or restoring action from being interfered, according to some embodiments, in FIG. 2A, the first pivoting element 22 may have an outer wall, and the outer wall adjacent to the second pivoting element 24 has a pivoting groove 222. The pivoting groove 222 is arranged along a pivoting track of the second pivoting element 24 and the restoring element 28 between the first position and the second position. The pivoting groove 222 is, for example, a closed groove (only movable in the direction of the pivoting track), an open groove (further movable in a direction other than the pivoting track, such as the pivoting groove 222 shown in FIG. 2A), which is not limited herein. Therefore, by appropriately adjusting the first pivoting element 22 and the second pivoting element 24, the first pivoting element 22 and the second pivoting element 24 can achieve the function of multi-stage pivoting by virtue of a restoring force of the restoring element 28.

The multi-positioning assembly 26a is connected to the first pivoting element 22 and the second pivoting element 24. The above connection method may be a physical connection method such as fixed or pivoting connection, which is not limited herein. For example, the second pivoting element 24 has a boss column. Then, a screw is passed from the first pivoting element 22 through the boss column to lock the second pivoting element 24, and then the first pivoting element 22, the multi-positioning assembly 26a and the second pivoting element 24 are thus connected. In addition, the multi-positioning assembly 26a has a plurality of positioning locations, and each positioning location temporarily positions the second pivoting element 24 relative to the first pivoting element 22.

The above temporary positioning refers to temporarily allowing the first pivoting element 22 and the second pivoting element 24 to be relatively immobile; that is, temporarily leaving the first pivoting element 22 and the second pivoting element 24 to be free from relative movement, such as no relative pivoting. When a total pivoting force between the first pivoting element 22 and the second pivoting element 24 is less than or equal to a pivoting threshold value, the multi-positioning assembly 26a can thus temporarily position the first pivoting element 22 with the second pivoting element 24 (for example, the second pivoting element 24 is positioned at the first position or at the second position). When the total pivoting force between the first pivoting element 22 and the second pivoting element 24 is greater than the pivoting threshold value, the temporarily positioning can be thus destroyed; that is, the second pivoting element 24 can be pivoted by the total pivoting force. The first position (for example, the first angle θ1 in FIG. 1B, or the first angle θ11 in FIG. 1C) is usually in a non-use state or folded state, and the second position (for example, the second angle θ3 in FIG. 1E) is usually in a use state or unfolded and fixed state. The second pivoting element 24 is only temporarily positioned no matter the second pivoting element 24 is at the first position or at the second position. The total pivoting force may be the force to pivot the second pivoting element 24 from the first position to the second position, or may be the force to pivot the second pivoting element 24 from the second position to the first position. The above pivoting threshold value refers to the clamping force provided by the multi-positioning assembly 26a to position (relatively immobile) the first pivoting element 22 with the second pivoting element 24 at the positioning locations.

For example, referring to FIG. 1B and FIG. 1D, the total pivoting force is a sum of the weight of the portable electronic element 30 and the pivoting force generated by the weight of the second pivoting element 24 (hereinafter referred to as a weight pivoting force) and the restoring force of the restoring element 28. When the second pivoting element 24 is temporarily positioned at the first position (as shown in FIG. 1B) or at the second position (as shown in FIG. 1D), the total pivoting force is less than or equal to the clamping force (that is, the pivoting threshold value). When the user applies an external force to pivot the second pivoting element 24 from the first position (FIG. 1B) to the second position (FIG. 1D), the total pivoting force is a sum of the external force, the weight pivoting force and the restoring force of the restoring element 28. When the total pivoting force is greater than the pivoting threshold value, the temporary positioning will be destroyed by the total pivoting force, so the second pivoting element 24 will be pivoted to the second position by the user (FIG. 1D). In this case, the external force applied by the user must be at least greater than the sum of the restoring force and the clamping force to pivot the second pivoting element 24 to the second position (FIG. 1D). Similarly, when the second pivoting element 24 is at the second position (FIG. 1D) and the user wants to pivot the second pivoting element 24 to the first position (FIG. 1B), due to the direction of the external force applied by the user is the same as the direction of the restoring force, it only needs a less external force to pivot the second pivoting element 24 to the first position (FIG. 1B). Additionally, when the car is running normally, the total pivoting force is also less than or equal to the pivoting threshold value, so the second pivoting element 24 can be temporarily positioned at the first position (FIG. 1B) or at the second position (FIG. 1D). When the second pivoting element 24 is temporarily positioned at the second position (FIG. 1D), in case of emergency braking of the car, collision of the portable electronic element 30 by the user, or collision of the second pivoting element 24, the total pivoting force will be greater than the pivoting threshold value and thus destroy the temporarily positioning, and the restoring force will then pivot the second pivoting element 24 from the second position (FIG. 1D) to the first position (FIG. 1B).

Therefore, through the multi-positioning assembly 26a, the second pivoting element 24 can thus be positioned between the specific positions (that is, different first positions and second positions) in a multi-stage and temporary manner. In addition, the second pivoting element 24 can be relatively pivoted to the first pivoting element 22 again due to external forces of different magnitudes subjected to by the second pivoting element 24, thereby achieving the function of multi-stage pivoting and temporarily positioning.

At the same time, by combining the multi-positioning assembly 26a and the restoring element 28 of the pivoting mechanism 20, the stand 10a can thus be pivoted and position in a multi-segment reciprocating manner between the first position and the second position (from the first position to the second position, or from the second position to the first position). Therefore, the stand 10a provided according to some embodiments of the present disclosure can be used as a stand of the rear seat entertainment system that is more user-friendly and safer, for example. The set of electronic device with the stand 10a can be further used as a rear seat entertainment system with more user-friendly operation and better safety, for example.

Referring to FIG. 2A again, the multi-positioning assembly 26a comprises a first positioning element 262a and a second positioning element 264a. The first positioning element 262a is connected to the first pivoting element 22. The first positioning element 262a comprises a first matching element 2622a. The second positioning element 264a is connected to the second pivoting element 24. The second positioning element 264a comprises a second matching element 2642a. The first matching element 2622a is matched to the second matching element 2642a at the positioning locations to temporarily position the first pivoting element with the second pivoting element. The above connection method may be a physical connection method such as fixed or pivoting connection, which is not limited herein. For example, the first positioning element 262a is fixed to the first pivoting element 22 without other relative movement, and the second positioning element 264a can also be fixed to the second pivoting element 24 in the same or similar manner as the first positioning element 262a, which is described as above and thus will not be described in detail herein. Therefore, the first pivoting element 22 and the second pivoting element 24 can be clamped at the positioning locations by the first matching element 2622a and the second matching element 2642a, thereby achieving the functions of multi-stage positioning and pivoting.

According to some embodiments, the first matching element 2622a comprises an elastic component. The first positioning element 262a has a first surface. The elastic component is on the first surface facing the second positioning element 264a, and the elastic component is normally protruding from the first surface. The second positioning element 264a comprises a plurality of recess parts. The second positioning element 264a has a second surface. The recess parts are on the second surface facing the first positioning element 262a. When the first pivoting element 22 and the second pivoting element 24 are selectively positioned at the first position or at the second position, the elastic component is clamped to one of the recess parts.

More specifically, the elastic component may be a combination of a spring and a ball, or a combination of a reed (or called a spring leaf) and a fixing column. The recess parts can be recesses, recessed holes, grooves, or any combination thereof. The recesses can be pits, for example. The recessed holes can be through holes, blind holes, or any combination thereof, for example. The grooves can be grooves (whose width, depth, inner shape, or bottom shape are not restricted) comprising strip grooves (such as long grooves) and radial grooves (such as grooves with a groove width increasing or decreasing from one end to the other end), for example. In addition, the "normally" referred to as normally protruding refers to the state where the elastic component is clamped at the positioning locations of the recess parts. In contrast, the "abnormal" refers to a state in which the elastic component collapses into the first surface and is at least at the same height as the first surface (or even collapses more deeply into the first surface), and thus the elastic component cannot be clamped at the positioning locations of the recess parts at this moment. Based on this, the elastic component needs to receive a force exceeding an elastic threshold value to cause the elastic component to produce sufficient collapsing deformation to pivot away from the recess parts of the positioning locations. Therefore, the first pivoting element 22 and the second pivoting element 24 can be clamped to each other at the positioning locations by the first matching element 2622a and the recess parts, thereby achieving the function of multi-stage positioning and pivoting.

The above elastic threshold value can be changed by adjusting the elastic coefficient of the elastic component. In addition, the recesses parts are disposed in accordance with at least the elastic coefficient of the elastic component (which will affect the elastic threshold value) and/or the elastic coefficient of the restoring element 28 (which will affect the pivoting threshold value). In more detail, according to some embodiments, the recess parts have different depths, widths, chamfers, or any combination thereof, so that the mutually clamped elastic components and the recess parts can provide different elastic threshold values because the elastic components is partially or wholly housed in the recess parts. For example, the deformation of the elastic components (caused by different depths that the elastic component is housed in the recess parts) and the elastic coefficients of the elastic component will further provide a variety of different elastic threshold values, and thus provide a variety of different pivoting threshold values. The greater the elastic threshold value, the greater the contribution to the restoring force and pivoting threshold value. Therefore, the required external force applied to the second pivoting element 24 needs to be increased in order to pivot the second pivoting element 24 having the increased elastic threshold value. Therefore, by adjusting the relative arrangement of the recess parts and/or the elastic components, the elastic threshold value of the elastic components can be changed, and the clamping force of the multi-positioning assembly 26a at each positioning location (that is, the difficulty of pivoting the second pivoting element 24 by applying the external force) can thus be adjusted.

Figure 2B:
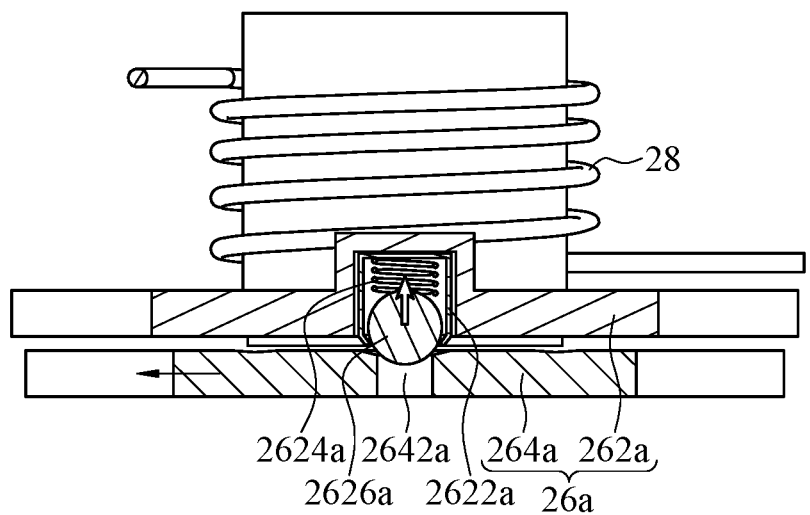
FIG. 2B illustrates a partial cross-sectional schematic diagram of a multi-positioning assembly as shown in FIG. 2A.

Referring to FIG. 2B, FIG. 2B illustrates a partial cross-sectional schematic diagram of a multi-positioning assembly 26a as shown in FIG. 2A. In FIG. 2B, as the second matching element 2642a, the recess parts are recesses, recessed holes (such as through holes or blind holes), or any combination thereof. As the first matching element 2622a, the elastic component comprises a spring 2624a and a bead 2626a. The spring 2624a is in the first surface. The bead 2626a is connected to the spring 2624, and the bead 2626a is normally protruding from the first surface. In addition, when the bead 2626a is substantially matched to each recess part and the bead 2626a is relatively pivoted to the recess part of each positioning location, the bead 2626a can be selectively clamped to one of the recess parts.

More specifically, in FIG. 2B, when the second positioning element 264a pivots in the direction of the black arrow (hereinafter referred to as the moving direction), the bead 2626a will be subjected to a force in the direction of the white arrow (hereinafter referred to as the collapsing direction) due to the rising of the outer edge of the recess parts. Then, the bead 2626a and the spring 2624a will generate a collapsing displacement in the collapsing direction. Then, when the second positioning element 264a continues to be pivoted to the next recess part of the next positioning location, the bead 2626a will again be subjected to by the restoring force of the spring 2624a. Then, the bead 2626a and the spring 2624a will therefore generate a restoring displacement in the opposite direction of the collapsing direction. Based on this, the bead 2626a will once again be clamped to the next recess part of the next positioning location.

According to some embodiments, the number and corresponding arrangement of the elastic components of the first matching element 2622a are not limited herein. That is, according to some embodiments of the present disclosure, the first matching element 2622a comprises at least one elastic component. Alternatively, the first matching element 2622a may comprise two elastic components (for example, 180°, halved into one plane), or three elastic components (for example, 120°, three halved into one plane), and so on.

Figure 2C:
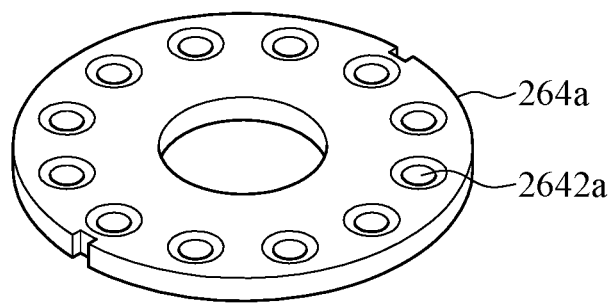
FIG. 2C illustrates a schematic diagram of a second matching element of the multi-positioning assembly according to some embodiments.
Figure 2D:
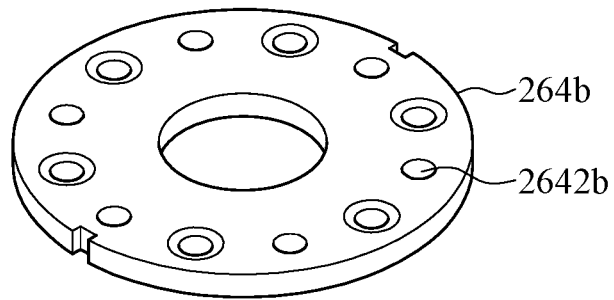
FIG. 2D illustrates a schematic diagram of a second matching element of the multi-positioning assembly according to some embodiments.

According to some embodiments, some or all of the recess parts as shown in FIG. 2A have chamfers at the second surface. Referring to FIG. 2C, FIG. 2C illustrates a schematic diagram of a second matching element 2642a of the multi-positioning assembly 26a according to some embodiments. In FIG. 2C, all the recess parts have chamfers at the second surface. Referring to FIG. 2D, FIG. 2D illustrates a schematic diagram of a second matching element 2624b of the multi-positioning assembly 26a according to some embodiments. In the second matching element 2642b of the second positioning element 264b in FIG. 2D, only some and spaced recess parts have chamfers at the second surface.

The dimension of the chamfer (such as a chamfer width, a chamfer depth or a chamfer angle) is defined as follows. Referring to FIG. 2B again, the chamfers of the recess parts of the second positioning element 264a have chamfer widths in the direction of the black arrow. The chamfers of the recess parts have the chamfer depths opposite to the direction of the white arrow. Furthermore, different chamfer depths and/or chamfer widths can also form different chamfer angles; for example, the arctangent formed by the chamfer depth and the chamfer width. As above mentioned, by changing the chamfer of the recess part, the elastic threshold value can be further adjusted. When the recess parts have the same chamfers, the recess parts will also have substantially the same elastic threshold value; that is, the contribution of the recess parts to the pivoting threshold value is substantially the same. On the contrary, when the recess parts have different chamfers, the recess parts will cause different elastic threshold values and thus different contribution of the recess parts to the pivoting threshold values. For example, the chamfer depths of the recess parts are adjusted, so that the recess parts with deeper chamfer depths can provide a greater elastic threshold value and a pivoting threshold value; therefore, a greater external force must be applied (for example, the braking force must be greater) to overcome the pivoting threshold value, so that the second pivoting element 24 can pivot. Therefore, by adjusting the arrangement of the chamfers of the recess parts, the recess parts at different positioning locations can provide different clamping effects.

Figure 2E:
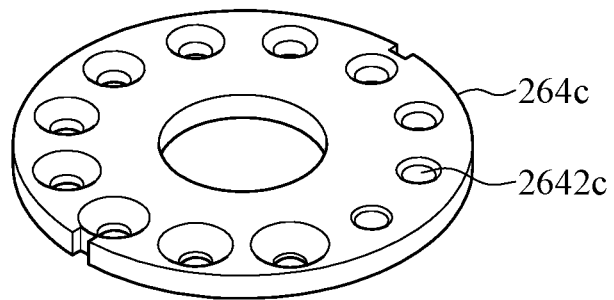
FIG. 2E illustrates a schematic diagram of a second matching element of the multi-positioning assembly according to some embodiments.

Referring to FIG. 2E, FIG. 2E illustrates a schematic diagram of a second matching element 2642c of the multi-positioning assembly 26a according to some embodiments. In the second matching element 2642c of the second positioning element 264c in FIG. 2E, at least two recess parts have chamfers on the second surface, and each chamfer has a chamfer depth. When the second pivoting element 24 is at the first position, the chamfer clamped by the bead 2626a is a first chamfer, and the chamfer depth of the first chamfer is called the first dimension (that is, the first depth). When the second pivoting element 24 is at the second position, the chamfer clamped by the bead 2626a is a second chamfer, and the chamfer depth of the second chamfer is called the second dimension (that is, the second depth). The first dimension (that is, the chamfer depth of the first chamfer) is greater than the second dimension (that is, the chamfer depth of the second chamfer). For example, the first dimension of the first position is 1.5 mm, and the second dimension of the second position is 0.5 mm. Therefore, the bead 2626a at the second position is less likely to be clamped to the recess part of the second dimension (where the chamfer depth is shallower and leads to a smaller elastic threshold value). Therefore, during the pivoting process, the second pivoting element 24 will easily pivot back to the first position due to the external force. On the contrary, the bead 2626a positioned more near to the first position is more likely to be clamped to the recess part of the first dimension (where the chamfer depth is deeper and leads to a greater elastic threshold value). Therefore, during the pivoting process, the second pivoting element 24 will be less likely to pivot back to the second position.

Figure 3A:
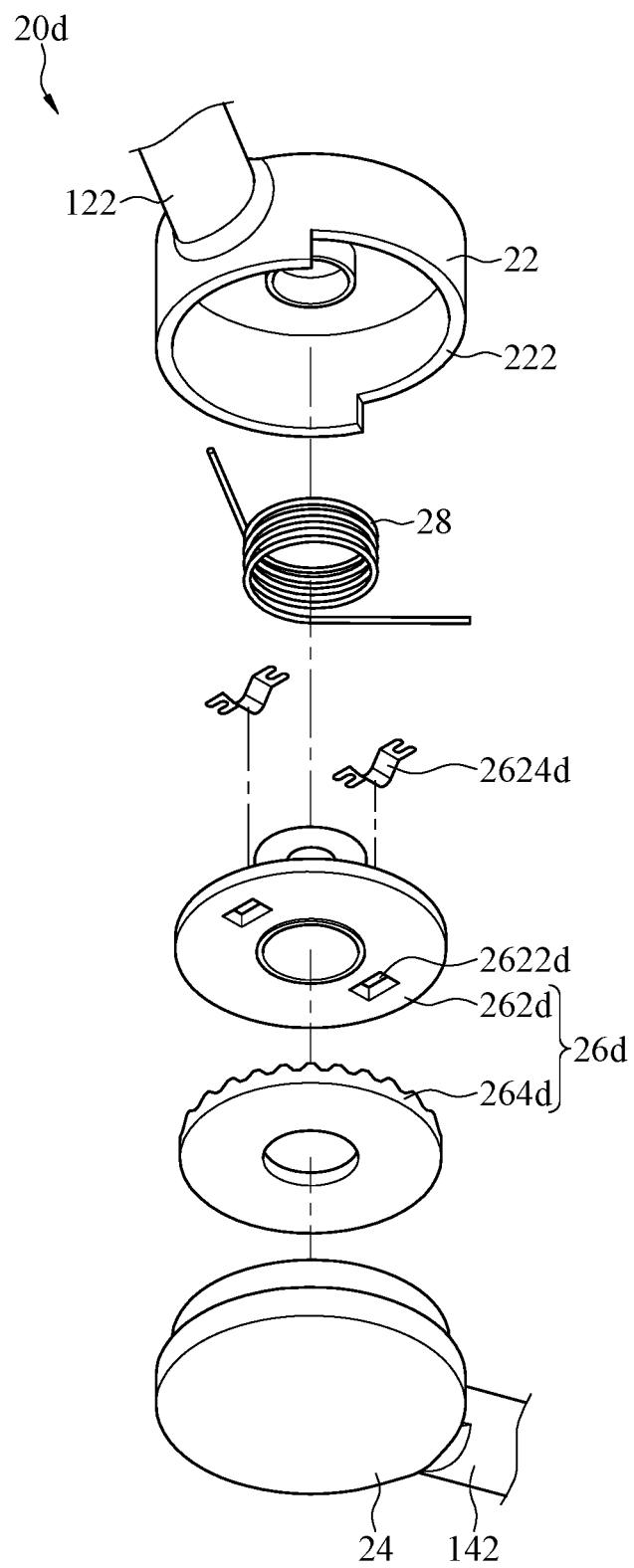
FIG. 3A illustrates a perspective explosion view of a pivoting mechanism according to some embodiments.
Figure 3B:
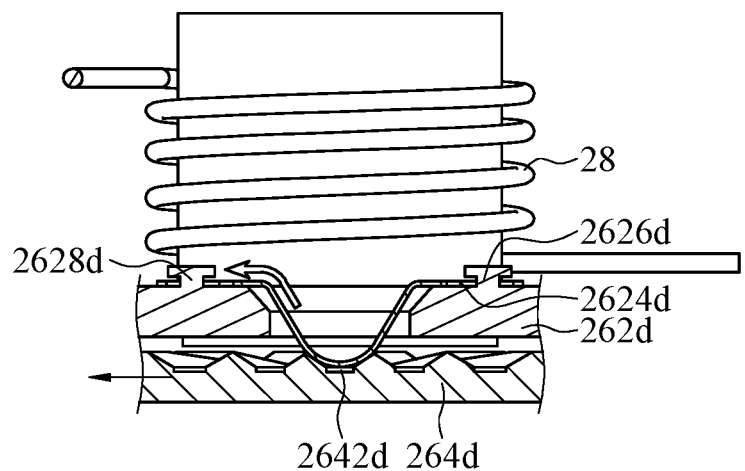
FIG. 3B illustrates a partial cross-sectional schematic diagram of a multi-positioning assembly as shown in FIG. 3A.

Referring to FIG. 3A to FIG. 3B, FIG. 3A illustrates a perspective explosion view of a pivoting mechanism 20d according to some embodiments, and FIG. 3B illustrates a partial cross-sectional schematic diagram of a multi-positioning assembly 26d as shown in FIG. 3A. Compared with the pivoting mechanism 20a of FIG. 2A, the pivoting mechanism 20d of FIG. 3A is different in that: the first positioning element 262d of the pivoting mechanism 20d has a different first matching element 2622d (that is, the elastic component), and the second positioning element 264d also has a different second matching element 2642d (that is, the recess part). In FIG. 3A to FIG. 3B, the recess parts are recesses, grooves (such as strip grooves, radial grooves, or any combination thereof), or any combination thereof, and the elastic component comprises a reed 2624d and a first fixing column 2626d. The grooves can be grooves (whose width, depth, inner shape, or bottom shape are not restricted) comprising strip grooves (such as long grooves) and radial grooves (such as grooves with a groove width increasing or decreasing from one end to the other end), for example. The first fixing column 2626d is in the first surface. One end of the reed 2624d corresponds to the first fixing column 2626d, and the reed 2624d normally protrudes from the first surface. In addition, the reed 2624d is substantially matched with the recess part, and when the reed 2624d is relatively pivoted to the recess part of each positioning location, the reed 2624d can be selectively clamped to one of the recess parts.

More specifically, referring to FIG. 3B, according to some embodiments, when the second positioning element 264d pivots in the direction of the black arrow (hereinafter referred to as the moving direction), the reed 2624d will receive a force in the direction of the white arrow (hereinafter referred to as the collapsing direction) due to the rising of the outer edge of the recess parts. Then, the reed 2624d will generate a collapsing displacement in the collapsing direction. Then, when the second positioning element 264d continues to be pivoted to the next recess part of the next positioning location, the reed 2624d will again be subjected to by the restoring force of the reed 2624d itself, and the reed 2624d will therefore generate a restoring displacement in the opposite direction of the collapsing direction. Therefore, the reed 2624d will once again be clamped to the next recess part of the next positioning location.

According to some embodiments, an end of the reed 2624d comprises a ditch. The ditch corresponds to the first fixing column 2626d, and the end of the reed 2624d can be a free end or a fixed end. According to some embodiments, the dimension (for example, a width) of the ditch is greater than the dimension (for example, a width or an outer diameter) of the first fixing column 2626d. The end of the reed 2624d is therefore a free end, which can be freely collapsed and restored. Or according to some embodiments, the dimension (for example, a width) of the ditch is less than or equal to the dimension (for example, a width or an outer diameter) of the first fixing column 2626d. The end of the reed 2624d is therefore a fixed end, and is substantially fixed to the first fixing column 2626d. The term "substantially fixed" herein means that although the reed 2624d collapses and restores during the pivoting process, the reed 2624d still cannot be separated from the first fixed column 2626d.

According to some embodiments, the elastic component further comprises a second fixing column 2628d. The second fixing column 2628d is in the first surface, and another end of the reed 2624d corresponds to the second fixing column 2628d. According to some embodiments, the dimension (for example, a width) of the ditch is greater than the dimension (for example, a width or an outer diameter) of the second fixing column 2628d. The another end of the reed 2624d is therefore a free end, which can be freely collapsed and restored. According to some embodiments, the dimension (for example, a width) of the ditch is less than or equal to the dimension (for example, a width or an outer diameter) of the second fixing column 2628d. The another end of the reed 2624d is therefore a fixed end, and is substantially fixed to the second fixing column 2628d. According to some embodiments, two ends of the reed 2624d are fixed ends. That is, an end of the reed 2624d is substantially fixed to the first fixing column 2626d, and another end of the reed 2624d is substantially fixed to the second fixing column 2628d.

In FIG. 3B, the dimension (for example, a width or an outer diameter) of the top of the first fixing column 2626d is greater than the dimension (for example, a width or an outer diameter) of the bottom of the first fixing column 2626d. Therefore, when the reed 2624d is collapsed or restored, the reed 2624d will not be separated from the top of the first fixing column 2626d. In addition, the second fixing column 2628d can also have a similar arrangement to the first fixing column 2626d, which is therefore not be described in detail herein.

Figure 3C:
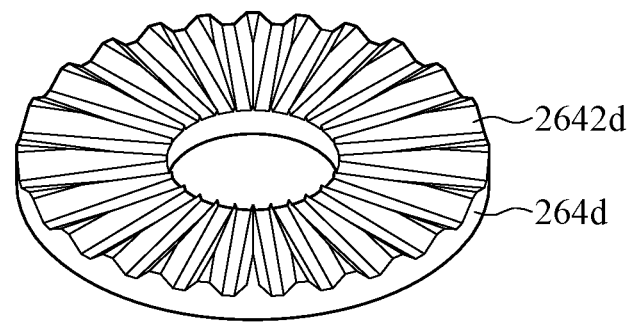
FIG. 3C illustrates a schematic diagram of a second matching element of the multi-positioning assembly according to some embodiments.

Referring to FIG. 3C, FIG. 3C illustrates a schematic diagram of a second matching element 2642d of the multi-positioning assembly 26*d* according to some embodiments. In FIG. 3C, the second matching element 2642*d* is radial grooves. The radial grooves are peripherally on the second surface of the second positioning element 264*d*, and a higher protrusion is arranged near to the outer edge of the second positioning element 264*d*. Therefore, the reed 2624*d* that is near to the radial grooves on the outer edge of the second positioning element 264*d* will have a better clamping effect.

In addition, according to some embodiments, in FIG. 2A, the elastic component of the first matching element 2622*a* and the recess parts of the second matching element 2642*a* (or the second matching element 2642*b* in FIG. 2D, or the second matching element 2642*c* in FIG. 2E) can be exchanged with each other. In FIG. 3A, the elastic component of the first matching element 2622*d* and the recess parts of the second matching element 2642*d* can be exchanged with each other. More specifically, according to some embodiments, in FIG. 2A, the first matching element 2622*a* comprises a plurality of recess parts. The first positioning element 262*a* has a first surface. The recess parts are on the first surface facing the second positioning element 264*a*. The second matching element 2642*a* comprises an elastic component. The second positioning element 264*a* has a second surface. The elastic component is on the second surface facing the first positioning element 262*a*. The above arrangement relationship and acting embodiments can be similar to those described above, which is therefore not be described in detail herein.

Figure 4A:
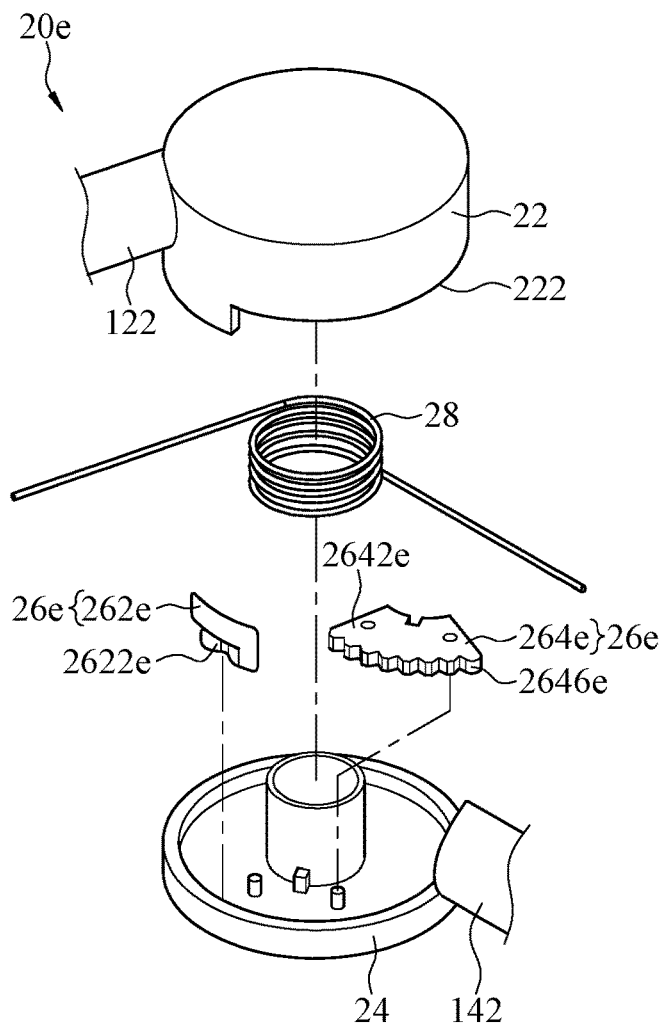
FIG. 4A illustrates a perspective explosion view of a pivoting mechanism according to some embodiments.
Figure 4B:
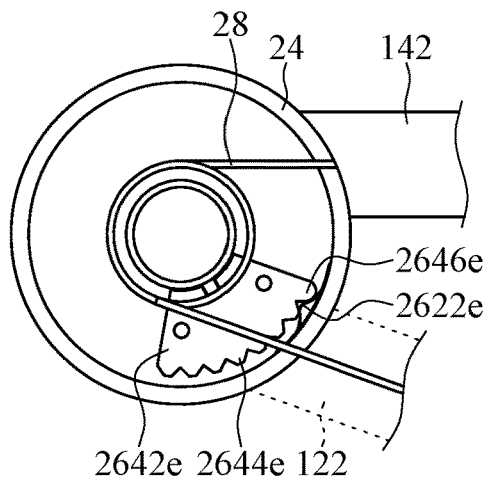
FIG. 4B illustrates a partial cross-sectional schematic diagram of a multi-positioning assembly as shown in FIG. 4A.

Referring to FIG. 4A and FIG. 4B at the same time, FIG. 4A illustrates a perspective explosion view of a pivoting mechanism 20*e* according to some embodiments, and FIG. 4B illustrates a partial cross-sectional schematic diagram of a multi-positioning assembly 26*e* as shown in FIG. 4A. In FIG. 4A and FIG. 4B, the first matching element 2622*e* of the first positioning element 262*d* is a reed, and the first matching element 2622*e* is connected to the first pivoting element 22. The second matching element 2642*e* of the second positioning element 264*e* is a gear (for example, a sector gear of part of a circle, or a gear of other shape), and the second matching element 2642*e* is connected to the second pivoting element 24. The second matching element 2642*e* (for example, a gear) has a plurality of mounting teeth 2644*e*, and the first matching element 2622*e* (for example, a reed) can be selectively positioned at one of the mounting teeth 2644*e*. The above connection method may be a physical connection method such as fixed or pivoting connection, which is not limited herein. Therefore, the first pivoting element 22 can be clamped by the second pivoting element 24 at the positioning locations by the first matching element 2622*e* and the second matching element 2642*e*, thereby achieving the function of multi-stage positioning and pivoting. In addition, according to some embodiments, the first matching element 2622*e* and the second matching element 2642*e* can be exchanged with each other, which is not limited herein.

According to some embodiments, the first matching element 2622*e* (for example, a reed) is on the outer edge of the first pivoting element 22, and the second matching element 2642*e* (for example, a gear) is on the second pivoting element 24. In FIG. 4A, according to some embodiments, an end of the first matching element 2622*e* is a fixed end, and the end of the reed is fixed on the outer edge of the first pivoting element 22. Another end of the first matching element 2622*e* is a free end, and the another end of the first matching element 2622*e* is freely disposed on the outer edge of the first pivoting element 22. The fixed end of the first matching element 2622*e* is an end more near to the first position, and the free end of the first matching element 2622*e* is an end more near to the second position (that is, more away from the first position). In FIG. 4B, according to some embodiments the second matching element 2642*e* is a sector gear. When the second matching element 2642*e* (for example, a sector gear) relatively pivots from the first position to the second position, the free end of the first matching element 2622*e* will have a relatively more collapsing space. Therefore, only a relatively small elastic threshold value is needed to be overcome by the second matching element 2642*e* to cause the free end of the first matching element 2622*e* to collapse along the outer edge of the first pivoting element 22. On the contrary, when the second matching element 2642*e* relatively pivots from the second position to the first position, the fixed end of the first matching element 2622*e* can only provide a relatively limited collapsing space, and thus the free end of the first matching element 2622*e* is needed to provide the rest of the collapsing space. Therefore, a relatively large elastic threshold value is needed to be overcome by the second matching element 2642*e* to cause the free end of the first matching element 2622*e* to collapse along the outer edge of the first pivoting element 22.

Figure 4C:
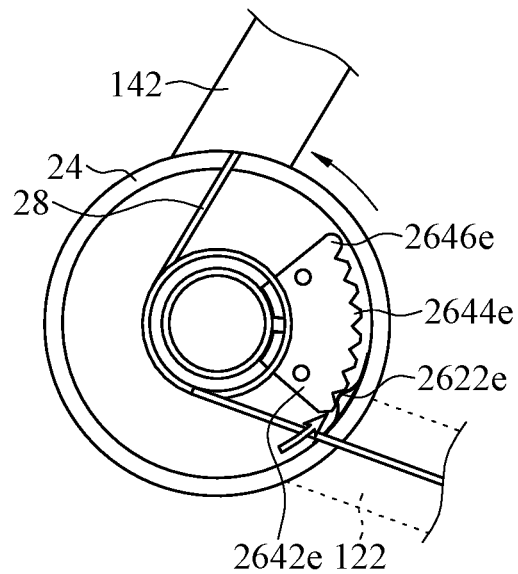
FIG. 4C illustrates a partial cross-sectional schematic diagram of a multi-positioning assembly as shown in FIG. 4A.
Figure 4D:
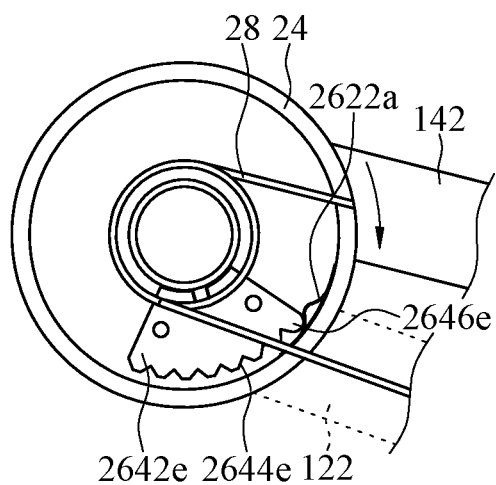
FIG. 4D illustrates a partial cross-sectional schematic diagram of a multi-positioning assembly as shown in FIG. 4A.

Referring to FIG. 4B to FIG. 4D at the same time, FIG. 4C illustrates a partial cross-sectional schematic diagram of a multi-positioning assembly 26*e* as shown in FIG. 4A, and FIG. 4D illustrates a partial cross-sectional schematic diagram of a multi-positioning assembly 26*e* as shown in FIG. 4A. The first pivoting element 22 and the second pivoting element 24 in FIG. 4B is relatively positioned at a first position; and the first pivoting element 22 and the second pivoting element 24 in FIG. 4C is relatively positioned at a second position. In FIG. 4C, when the second matching element 2642*e* (for example, a sector gear) pivots in the direction of the black arrow (hereinafter referred to as the pivoting direction), the first matching element 2622*e* (for example, a reed) will be subjected to a force in the direction of the white arrow (hereinafter referred to as the collapsing direction) due to the rising of the tooth of the second matching element 2642*e*. Then, the first matching element 2622*e* will generate a collapsing displacement in the collapsing direction. Then, when the first matching element 2622*e* continues to be pivoted to the next tooth of the next positioning location, the first matching element 2622*e* will again be subjected to by the restoring force of the first matching element 2622*e* itself. Then, the first matching element 2622*e* will therefore generate a restoring displacement in the opposite direction of the collapsing direction. Based on this, the first matching element 2622*e* will once again be clamped to the next tooth of the next positioning location.

Figure 4E:
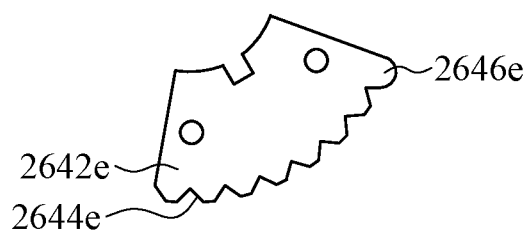
FIG. 4E illustrates a schematic diagram of a second matching element of the multi-positioning assembly according to some embodiments.

Further, referring to FIG. 4E, FIG. 4E illustrates a schematic diagram of a second matching element 2642*e* of the multi-positioning assembly 26*e* according to some embodiments. In FIG. 4E, the second matching element 2642*e* is a sector gear. The second matching element 2642*e* (for example, a sector gear) has a plurality of mounting teeth 2644*e*. The first matching element 2622*e* (for example, a reed) is selectively clamped to one of the mounting teeth 2644*e*. In FIG. 4E, according to some embodiments, the second matching element 2642*e* further has a limiting tooth 2646*e*. The limiting tooth 2646*e* is adjacent to the mounting teeth 2644*e*, and the limiting tooth 2646 is disposed on an end of the second matching element 2642*e* that is more near to the second position. The height of the limiting tooth 2646*e* is greater than the heights of the mounting teeth 2644*e*. Therefore, the first matching element 2622*e* needs to be subjected to a force exceeding the elastic force threshold value, so that the first matching element 2622e can generate a sufficient collapsing deformation to allow the limiting tooth 2646e having a higher height of the tooth to pass through the collapsing first matching element 2622e. More specifically, in FIG. 4D, when the second pivoting element 24 pivots from the second position to the first position in the direction of the arrow, the first matching element 2622e is meanwhile subjected to a force exceeding the elastic threshold value to produce a sufficient collapsing deformation. Based on this, the limiting tooth 2646e having a higher height of the tooth can thus pass through the collapsing first matching element 2622e instead of restoring and passing through the collapsing first matching element 2622e. Therefore, the limiting tooth 2646e can limit and prevent the second matching element 2642e from pivoting towards the second position under the circumstances that the first matching element 2622e is subjected to a force not exceeding the elastic threshold value. Therefore, the first pivoting element 22 and the second pivoting element 24 can achieve the effect of limiting and buffering.

Figure 5A:
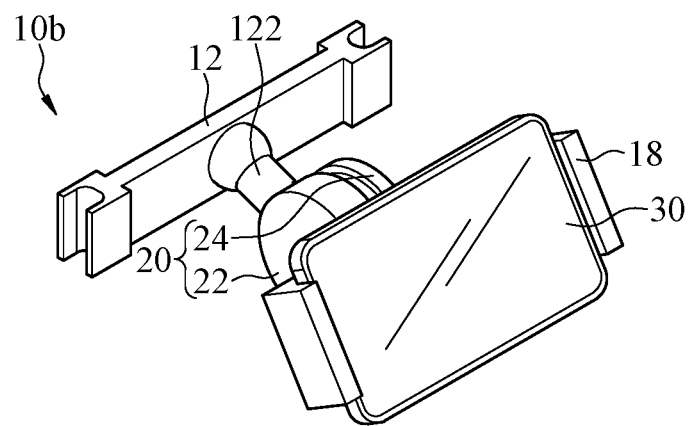
FIG. 5A illustrates a perspective view of a set of electronic device according to some embodiments.
Figure 5B:
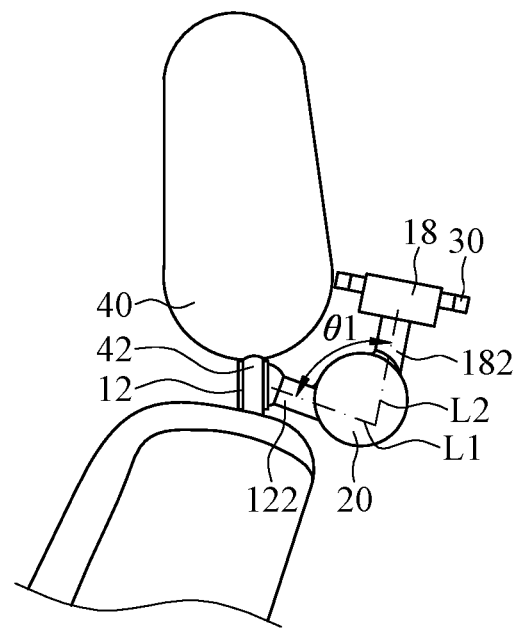
FIG. 5B illustrates a side view of a set of electronic device according to some embodiments.
Figure 5C:
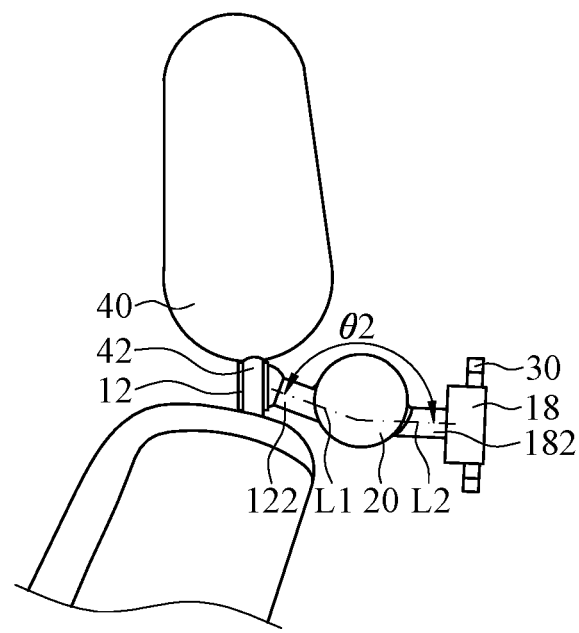
FIG. 5C illustrates a side view of a set of electronic device according to some embodiments.

Referring to FIG. 5A to FIG. 5C, FIG. 5A illustrates a perspective view of a set of electronic device according to some embodiments, and FIG. 5B and FIG. 5C respectively illustrate a side view of a set of electronic device according to some embodiments. The stands 10b as shown in FIG. 5B and FIG. 5C are relatively positioned at a first position (with a first angle θ1) and a second position (with a second angle θ2), respectively. The above first position and the second position can not only be judged by referring to the definition of the above first angle θ1 and second angle θ2, but also can be judged by the "relative distance" between the second pivoting element 24 and the stand fixing element 12. According to some embodiments, the distance between the stand fixing element 12 and the second pivoting element 24 at the second position (shown in FIG. 5C) is greater than the distance between the stand fixing element 12 and the second pivoting element 24 at the first position (shown in FIG. 5B).

In FIG. 5A, the set of electronic device has only one pivoting mechanism 20 and no other hinges that can be used for pivoting. An end of the pivoting mechanism 20 is connected to the stand fixing element 12 through a stand connector 122, and another end of the pivoting mechanism 20 is connected to the device fixing element 18 through a device connector 182. Therefore, the pivoting mechanism 20 can also be arranged in the stand 10b with a smaller extending angle relative to the stand 10a in FIG. 1A, thereby providing more stands 10b and sets of electronic device with different design changes.

According to some embodiments, the stand 10a further comprises at least one hinge, and the hinge is connected to the pivoting mechanism 20. The above connection method may be a physical connection method such as fixed or pivoting connection, which is not limited herein. Through the combination of the hinge and the pivoting mechanism 20, the stand fixing element 12 can be further connected with the device fixing element 18. Therefore, each pivoting of the stand 10a can be bent and folded independently at different angles.

Referring to FIG. 1A to FIG. 1D, according to some embodiments, the stand 10a further comprises a first hinge 14, and the first hinge 14 comprises a first rod element 142 and a second rod element 144. The first rod element 142 is pivotally connected to the second rod element 144, and the first rod element 142 is connected to the second pivoting element 24 (or the second pivoting element 24 can be changed to the first pivoting element 22 under the premise that the pivoting of the stand 10a is still achievable). The second rod element 144 is connected to the device fixing element 18. Further, according to some embodiments, the first rod element 142 and the second rod element 144 can be exchanged with each other. That is, the first rod element 142 is pivotally connected to the device fixing element 18, and the second rod element 144 is connected to the second pivoting element 24 (or the second pivoting element 24 can be changed to the first pivoting element 22 under the premise that the pivoting of the stand 10a is still achievable). Therefore, the pivoting mechanism 20 can also be arranged in the stand 10a with at least one hinge, thereby providing more stands 10a and sets of electronic device with different design changes.

Figure 6A:
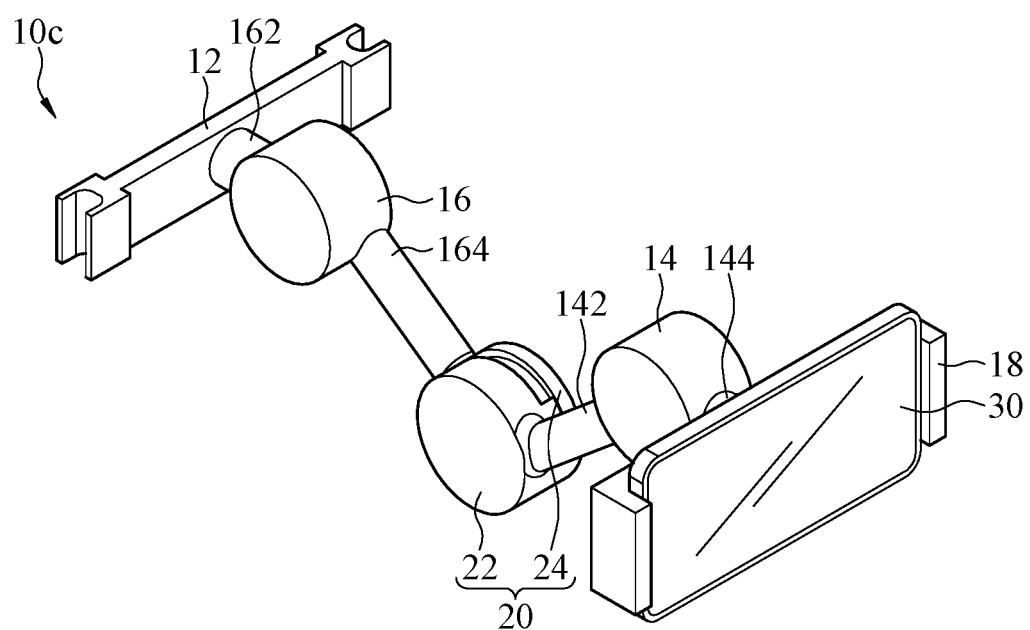
FIG. 6A illustrates a perspective view of a set of electronic device according to some embodiments.
Figure 6B:
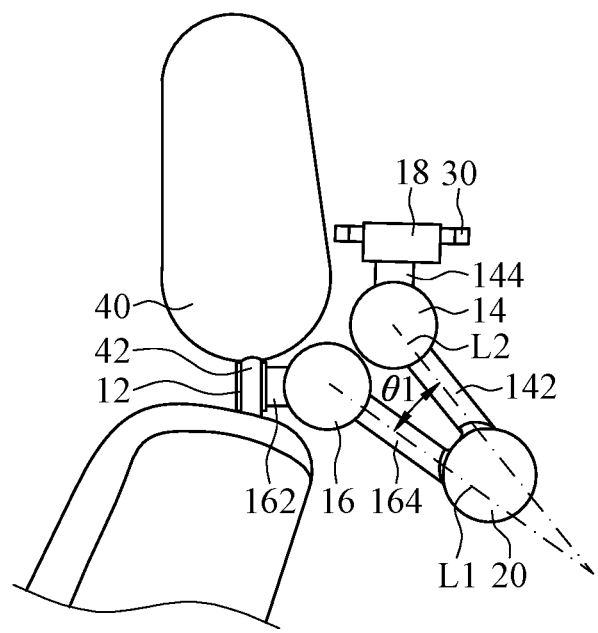
FIG. 6B illustrates a side view of a set of electronic device according to some embodiments.
Figure 6C:
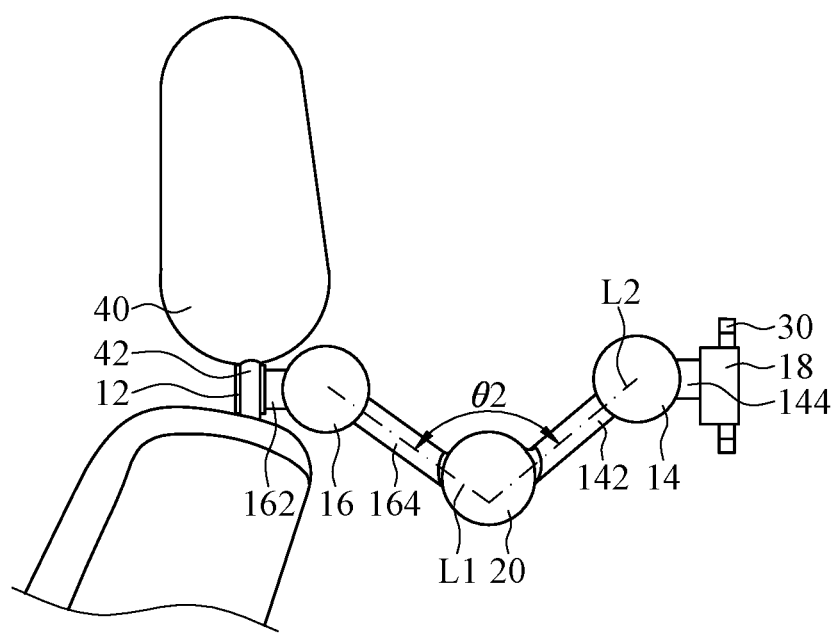
FIG. 6C illustrates a side view of a set of electronic device according to some embodiments.

Referring to FIG. 6A to FIG. 6C, FIG. 6A illustrates a perspective view of a set of electronic device according to some embodiments, and FIG. 6B and FIG. 6C respectively illustrate a side view of a set of electronic device according to some embodiments. The stands 10c as shown in FIG. 6B and FIG. 6C are relatively positioned at a first position (with a first angle θ1) and a second position (with a second angle θ2), respectively. According to some embodiments, the set of electronic device comprises two hinges. In FIG. 6A to FIG. 6C, the set of electronic device comprises a first hinge 14 and a second hinge 16. The first hinge 14 shown in FIG. 6A is similar to the first hinge 14 shown in FIG. 1A, which is therefore not described in detail herein. The second hinge 16 comprises a third rod element 162 and a fourth rod element 164. The third rod element 162 is pivotally connected to the fourth rod element 164, and the third rod element 162 is connected to the stand fixing element 12. The fourth rod element 164 is connected to the first pivoting element 22 (or the first pivoting element 22 can be changed to the second pivoting element 24 under the premise that the pivoting of the set of electronic device is still achievable). Further, according to some embodiments, the third rod element 162 and the fourth rod element 164 can be exchanged with each other. That is, the third rod element 162 is connected to the first pivoting element 22 (or the first pivoting element 22 can be changed to the second pivoting element 24 under the premise that the pivoting of the set of electronic device is still achievable). The fourth rod element 164 is connected to the stand fixing element 12. Therefore, the pivoting mechanism 20 can also be arranged in the stand 10a with at least two hinges, thereby providing more stands 10c and sets of electronic device with different design changes.

In addition, according to some embodiments, except as shown in the drawings, each pivoting position in the stands 10b, 10c can be all replaced by the pivoting mechanism 20, which is not limited herein. For example, the first hinge 14 of the stand 10b, and the first hinge 14 and the second hinge 16 of the stand 10c can be all replaced by the pivoting mechanism 20, respectively. Therefore, the pivoting mechanism 20 can therefore provide more stands 10b, 10c and sets of electronic device with different design changes.

In summary, embodiments of the present disclosure have pivoting mechanisms having multi-positioning assemblies, so that a multi-position and multi-stage temporary clamping can be formed at a plurality of positioning locations between a first position and a second position. Such a temporary clamping can cause a first pivoting element and a second pivoting element to relatively pivot to each other again or even restore when the pivoting mechanism is subjected to a force exceeding a pivoting threshold value. Therefore, whether it is the pivoting mechanism itself, the stand with the pivoting mechanism, or the set of electronic device with the stand, it will all be able to provide a safer and more secure restoring mechanism to avoid unnecessary damage.

Although the present disclosure is disclosed in the foregoing embodiments as above, it is not intended to limit the present disclosure. Any person who is familiar with the relevant art can make some changes and modifications without departing from the spirit and scope of the present disclosure. Therefore, the scope of the present disclosure shall be subject to the definition of the scope of patent application attached to the specification.

What is claimed is:

1. A set of electronic device, comprising:
   a stand fixing element;
   a pivoting mechanism comprising:
      a first pivoting element connected to the stand fixing element;
      a second pivoting element pivotally connected to the first pivoting element and having a first position and a second position, wherein a distance between the stand fixing element and the second pivoting element at the second position is greater than a distance between the stand fixing element and the second pivoting element at the first position;
      a multi-positioning assembly connected to the first pivoting element and the second pivoting element, the multi-positioning assembly providing with a plurality of positioning locations to temporarily position the first pivoting element with the second pivoting element; and
      a restoring element having two ends, the two ends respectively contacting the first pivoting element and the second pivoting element, wherein the restoring element has a first deformation when the second pivoting element is at the first position; the restoring element has a second deformation when the second pivoting element is at the second position; and the first deformation is less than the second deformation;
   a device fixing element connected to the second pivoting element; and
   a portable electronic element, the device fixing element holding the portable electronic element.

2. The set of electronic device according to claim 1, wherein the multi-positioning assembly comprises:
   a first positioning element connected to the first pivoting element and having a first surface; and
   a second positioning element connected to the second pivoting element and having a second surface, the second positioning element comprising a second matching element, the second matching element comprising a plurality of recess parts on the second surface facing the first positioning element,
   wherein the first positioning element comprises a first matching element, the first matching element comprises an elastic component, the elastic component is on the first surface facing the second positioning element, and the elastic component normally protrudes from the first surface, and the elastic component comprises:
      a spring in the first surface; and
      a bead connected to the spring and normally protruding from the first surface, and the bead selectively positioned at one of the recess parts to temporarily position the first pivoting element with the second pivoting element.

3. A stand, comprising:
   a stand fixing element;
   a pivoting mechanism comprising:
      a first pivoting element connected to the stand fixing element;
      a second pivoting element pivotally connected to the first pivoting element and having a first position and a second position, wherein a distance between the stand fixing element and the second pivoting element at the second position is greater than a distance between the stand fixing element and the second pivoting element at the first position;
      a multi-positioning assembly connected to the first pivoting element and the second pivoting element, and providing with a plurality of positioning locations to temporarily position the first pivoting element with the second pivoting element; and
      a restoring element having two ends, the two ends respectively contacting the first pivoting element and the second pivoting element, wherein the restoring element has a first deformation when the second pivoting element is at the first position; the restoring element has a second deformation when the second pivoting element is at the second position; and the first deformation is less than the second deformation; and
   a device fixing element connected to the second pivoting element.

4. The stand according to claim 3, further comprising a first hinge, the first hinge comprising a first rod element and a second rod element, wherein the first rod element is pivotally connected to the second rod element; the first rod element is connected to the second pivoting element; and the second rod element is connected to the device fixing element.

5. The stand according to claim 3, wherein the multi-positioning assembly comprises:
   a first positioning element connected to the first pivoting element, the first positioning element comprising a first matching element; and
   a second positioning element connected to the second pivoting element, the second positioning element comprising a second matching element, wherein the first matching element is matched to the second matching element at the positioning locations to temporarily position the first pivoting element with the second pivoting element.

6. The stand according to claim 5, wherein:
   the first positioning element has a first surface;
   the second positioning element has a second surface;
   the second matching element comprises a plurality of recess parts on the second surface facing the first positioning element; and
   the first matching element comprises an elastic component on the first surface facing the second positioning element, and the elastic component normally protrudes from the first surface, and the elastic component comprises:
      a spring in the first surface; and
      a bead connected to the spring and normally protruding from the first surface, and the bead selectively positioned at one of the recess parts to temporarily position the first pivoting element with the second pivoting element.

7. The stand according to claim 5, wherein:
   the first positioning element has a first surface;
   the second positioning element has a second surface;

the second matching element comprises a plurality of recess parts on the second surface facing the first positioning element; and the first matching element comprises an elastic component on the first surface facing the second positioning element, and the elastic component normally protrudes from the first surface, and the elastic component comprises:

a first fixing column in the first surface; and a reed having an end, the end corresponding to the first fixing column, the reed normally protruding from the first surface, and the reed selectively positioning at one of the recess parts to temporarily position the first pivoting element with the second pivoting element.

8. The stand according to claim 5, wherein the first matching element is a reed, and the second matching element is a sector gear, wherein the sector gear has a plurality of mounting teeth, and the reed is selectively positioned at one of the mounting teeth to temporarily position the first pivoting element with the second pivoting element.

9. A pivoting mechanism, comprising:

a first pivoting element;

a second pivoting element pivotally connected to the first pivoting element, the second pivoting element having a first position and a second position, wherein between the first pivoting element and the second pivoting element has a first angle when the second pivoting element is at the first position; between the first pivoting element and the second pivoting element has a second angle when the second pivoting element is at the second position; and the first angle is less than the second angle;

a multi-positioning assembly connected to the first pivoting element and the second pivoting element, the multi-positioning assembly providing with a plurality of positioning locations to temporarily position the first pivoting element with the second pivoting element; and a restoring element having two ends, the two ends respectively contacting the first pivoting element and the second pivoting element, wherein the restoring element has a first deformation when the second pivoting element is at the first position; the restoring element has a second deformation when the second pivoting element is at the second position; and the first deformation is less than the second deformation.

10. The pivoting mechanism according to claim 9, wherein the multi-positioning assembly comprises:

a first positioning element connected to the first pivoting element, the first positioning element comprising a first matching element; and a second positioning element connected to the second pivoting element, the second positioning element comprising a second matching element, wherein the first matching element is matched to the second matching element at the positioning locations to temporarily position the first pivoting element with the second pivoting element.

11. The pivoting mechanism according to claim 10, wherein:

the first positioning element has a first surface;

the second positioning element has a second surface;

the first matching element comprises an elastic component on the first surface facing the second positioning element, and the elastic component normally protrudes from the first surface; and the second matching element comprises a plurality of recess parts on the second surface facing the first positioning element, wherein the first pivoting element and the second pivoting element are selectively on the first position or the second position, and the elastic component is positioned at one of the recess parts to temporarily position the first pivoting element with the second pivoting element.

12. The pivoting mechanism according to claim 11, wherein the elastic component comprises:

a spring in the first surface; and a bead connected to the spring and normally protruding from the first surface, the bead selectively positioned at one of the recess parts to temporarily position the first pivoting element with the second pivoting element.

13. The pivoting mechanism according to claim 12, wherein each of some of the recess parts has a chamfer.

14. The pivoting mechanism according to claim 13, wherein:

the chamfer at which the bead is positioned is a first chamfer when the second pivoting element is at the first position, the chamfer at which the bead is positioned is a second chamfer when the second pivoting element is at the second position, and a chamfer depth of the first chamfer is greater than a chamfer depth of the second chamfer.

15. The pivoting mechanism according to claim 11, wherein the elastic component comprises:

a first fixing column in the first surface; and a reed having an end, the end corresponding to the first fixing column, the reed normally protruding from the first surface, and the reed selectively positioned at one of the recess parts to temporarily position the first pivoting element with the second pivoting element.

16. The pivoting mechanism according to claim 15, wherein the end of the reed has a ditch, and a dimension of the ditch is greater than a dimension of the first fixing column.

17. The pivoting mechanism according to claim 15, wherein the elastic component comprises a second fixing column; the second fixing column is in the first surface; and another end of the reed corresponds to the second fixing column.

18. The pivoting mechanism according to claim 17, wherein the end of the reed is fixed to the first fixing column, and the another end of the reed is fixed to the second fixing column.

19. The pivoting mechanism according to claim 10, wherein the first matching element is a reed, and the second matching element is a sector gear, wherein the sector gear has a plurality of mounting teeth, and the reed is selectively positioned at one of the mounting teeth to temporarily position the first pivoting element with the second pivoting element.

20. The pivoting mechanism according to claim 19, wherein the sector gear has a limiting tooth; the limiting tooth is disposed to the mounting teeth; the limiting tooth is on a side of the sector gear; the side is relatively near to the second position; and a height of the limiting tooth is higher than heights of the mounting teeth.

* * * * *